United States Patent [19]

Smith et al.

[11] Patent Number: 5,378,019

[45] Date of Patent: Jan. 3, 1995

[54] CONTROLLED DEPLOYMENT DRIVER'S SIDE AIR BAG

[75] Inventors: Bradley W. Smith, Ogden; Bradley D. Harris, Farmington, both of Utah

[73] Assignee: Morton International, Inc., Chicago, Ill.

[21] Appl. No.: 29,690

[22] Filed: Mar. 11, 1993

[51] Int. Cl.$^6$ .............................................. B60R 21/16
[52] U.S. Cl. ............................ 280/743 R; 280/743 A
[58] Field of Search ............... 280/728 R, 731, 743 A, 280/743 R

[56] References Cited

U.S. PATENT DOCUMENTS

| | | | |
|---|---|---|---|
| 3,476,402 | 11/1969 | Wilfert | 280/729 |
| 3,730,551 | 5/1973 | Sack et al. | 280/743 |
| 3,756,620 | 9/1973 | Radke | 280/743 |
| 3,797,855 | 3/1974 | Wright, Jr. | 280/743 |
| 3,810,654 | 5/1974 | DeBano, Jr. et al. | 280/743 |
| 3,842,583 | 10/1974 | Gage | 280/743 R |
| 3,874,693 | 4/1975 | Patzelt et al. | 280/743 |
| 3,879,056 | 4/1975 | Kawashima et al. | 280/743 A |
| 3,879,057 | 4/1975 | Kawashima et al. | 280/743 A |
| 3,891,272 | 6/1975 | Takada | 297/386 |
| 3,938,824 | 2/1976 | Patzelt | 280/743 |
| 3,990,726 | 11/1976 | Oka et al. | 280/743 |
| 4,186,941 | 2/1980 | Scholz et al. | 280/743 |
| 4,213,634 | 7/1980 | Hoshino et al. | 280/728 |
| 4,805,930 | 2/1989 | Takada | 280/739 |
| 4,828,286 | 5/1989 | Föhl | 280/731 |
| 4,830,401 | 5/1989 | Honda | 280/736 |
| 4,842,300 | 6/1989 | Ziomek et al. | 280/732 |
| 5,033,771 | 7/1991 | Miyauchi et al. | 280/728 |
| 5,044,663 | 9/1991 | Seizert | 280/730 |
| 5,048,863 | 9/1991 | Henseler et al. | 280/743 |
| 5,078,423 | 1/1992 | Fujita | 280/743 |
| 5,087,071 | 2/1992 | Wallner et al. | 280/743 |
| 5,094,477 | 3/1992 | Togawa | 280/743 |

FOREIGN PATENT DOCUMENTS

| | | | |
|---|---|---|---|
| 2030863 | 12/1971 | Germany | 280/743 |
| 2944319 | 5/1981 | Germany | 280/728 |
| 2279441 | of 0000 | Japan | 280/743 |
| 0136945 | 6/1991 | Japan | 280/743 A |

*Primary Examiner*—Eric D. Culbreth
*Assistant Examiner*—Paul N. Dickson
*Attorney, Agent, or Firm*—George W. Rauchfuss, Jr.; Gerald K. White

[57] ABSTRACT

A driver's side vehicle air bag, including releasable stitching for controlled deployment, comprises circular front and rear panels joined at their peripheries. A central inlet opening in the rear panel is flanked by parallel lines of releasable stitching to form a central region and lateral lobes. Interruptions of the stitching adjacent the inlet opening produce passageways for direct flow of inflation gas to the lateral lobes. The air bag is folded in accordian folds perpendicular to the stitch lines, and thereafter in packing folds perpendicular to the accordian folds. During the inflation, outward deployment of the front panel is retarded by the stitching and the lateral lobes inflate to create a broad frontal surface. The stitches release prior to full inflations.

25 Claims, 4 Drawing Sheets

CONTROLLED DEPLOYMENT DRIVER'S SIDE AIR BAG

BACKGROUND OF THE INVENTION

1. Field of the Invention

The invention herein refers to a vehicle air bag, and more particularly to a driver's side vehicle air bag adapted to deploy in a controlled manner.

2. Prior Art

Many modern vehicles incorporate one or more inflatable air bags for the protection of occupants in the event of a crash. The air bags are mounted in a folded, compact condition in conjunction with a gas generator, and upon sensing of a vehicle crash, the gas generator produces inflation gas which rapidly deploys and inflates the air bag.

The driver's side air bag is typically mounted in the hub of a steering wheel and deploys toward the driver as the driver experiences relative motion toward the wheel and deploying air bag. The thrust or main axis of deployment of the air bag is directly toward the driver, and the material of the air bag initially forms an elongated column, the end of which may strike the driver (sometimes in the face) occasionally resulting in abrasions. As the gas generator continues to provide inflation gasses, and the air bag then fills laterally to provide the desired broad cushion. The formation and travel of the initial elongated column of air bag material is in large part a result of inertia provided to the material of the air bag upon initial rapid deployment, and is not solely a function of inflation pressure within the air bag.

Driver's side air bags have been provided with internal tether straps to restrain the range of initial inertial deployment toward the driver. Two to four anchored tether straps have their ends secured to the front panel of the air bag to limit the extent of deployment of the front panel toward the driver. This tether strap system, although efficient in limiting the extent of deployment, has some drawbacks of its own. The tether straps add concentrated points of mass to the front panel and this additional mass in part exacerbates the problem in that more kinetic energy is developed and imparted to the driver if the air bag reaches the driver, with a consequent greater chance of injury. The tether straps also cause stress concentration at the attachment points, thereby requiring additional reinforcement to prevent failure of the air bag. Further, the tether straps add bulk and weight to the air bag module, when it is desirable to keep the module as light and compact as possible for mounting in the steering wheel hub.

Accordingly, there is a need for better control in the deployment of a driver's side air bag while retaining simplicity and reliability in the manufacturing and operation thereof.

SUMMARY OF THE INVENTION

An object of the invention herein is to provide an improved air bag for protecting the occupant of a vehicle in a crash.

Another object of the invention is to provide an improved air bag which is particularly well adapted for mounting in a steering wheel hub on the driver's side of the vehicle.

A further object of the invention is to provide an air bag which minimizes the potential of injury from impact by the material of the air bag itself.

An additional object of the invention is to provide an air bag which exhibits controlled deployment.

Yet another object of the invention is to provide an air bag in which initial deployment of the center portion of the bag is retarded and the initial deployment of the side portions of the air bag is enhanced.

A still further object of the invention is to provide an air bag which exhibits controlled deployment with a minimum bulk and weight.

It is also an object of the invention to provide an air bag which exhibits ease of manufacture and reliability in operation.

In accomplishing these and other objects of the invention, there is provided a vehicle air bag for inflation to cushion an occupant in the event of a vehicle crash, wherein the air bag comprises a front and rear panel having their outer peripheral edges joined together. The rear panel defines a central inlet opening adapted for attachment to a source of inflation gas. The front and rear panels are further releasably joined by breakaway stitching positioned to provide the air bag with two lateral lobes, the stitching further being deployed to provide a direct flow of inflation gas to the lateral lobes upon initial gas generation and consequent deployment of the air bag. According to one aspect of the invention, a central region is provided between the lateral lobes, and the stitching defines passageways for permitting gas flow to the lateral lobes prior to breaking away of the stitching.

According to another aspect of the invention, the air bag is folded for storage prior to deployment by a first series of accordian folds transverse the stitching which provides central region and lateral lobes, and by a second series of packing folds transverse the accordian folds.

Upon rapid introduction of inflation gas through the inlet opening, the central portion of the front panel juxtaposed the inlet opening is initially deployed forwardly, but is retarded from full extension by the breakaway stitching attachment with the rear panel. A substantial portion of the inflation gas flows to the lateral lobes of the air bag to increase its inflated diameter. As inflation proceeds, the breakaway stitching connecting the front and rear panels releases, and the air bag expands to its fully inflated shape.

According to certain aspects of the invention, the breakaway stitching is deployed in parallel stitch lines defining the central region of the air bag therebetween, and interrupted in the vicinity of the inlet opening to provide a passage for direct flow of inflation gas to the lateral lobes of the air bag. The parallel lines of breakaway stitching may flank the inlet opening.

According to certain other aspects of the invention, the stitch lines are terminated by back stitching, by lock stitching or, when a meltable thread is used, by melting the ends thereof. Further features of the invention include providing the stitching on a bias to the fabric of the front panel, and terminating the stitch lines in angled or curved portions, including looped portions that cross the stitch line prior to termination.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

DRAWINGS

The same reference numerals refer to the same elements throughout the various figures.

DESCRIPTION OF PREFERRED EMBODIMENTS

Figure 1:
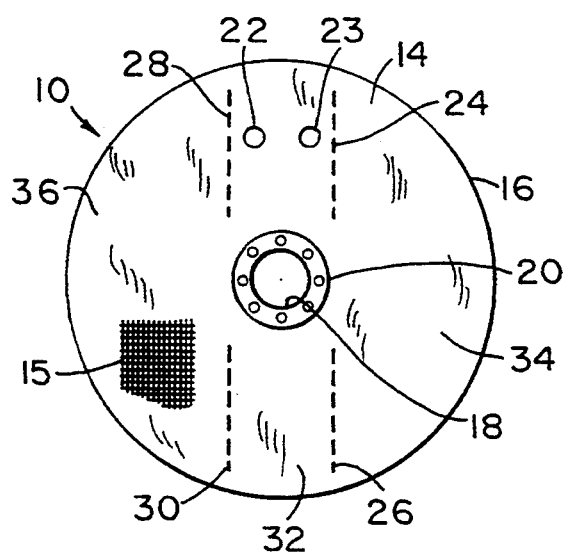
FIG. 1 is a rear elevation view of an air bag according to the invention herein, unfolded and uninflated.
Figure 2:
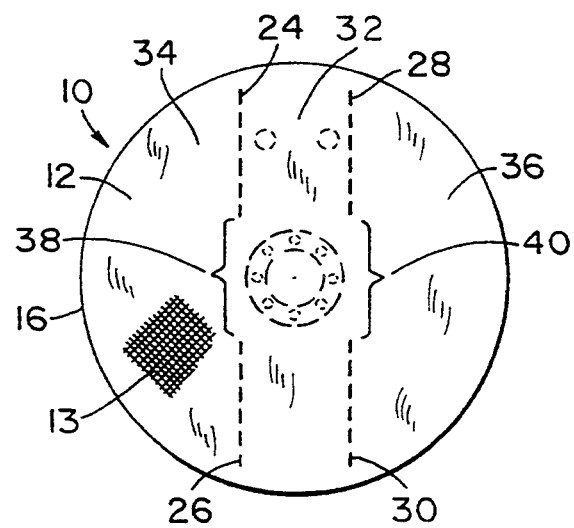
FIG. 2 is a front elevation view of the air bag of FIG. 1, unfolded and uninflated.

FIGS. 1 and 2 depict an air bag 10 particularly well suited for use on the driver's side of a vehicle. The air bag is unfolded and uninflated, and viewed from the rear in FIG. 1 and the front in FIG. 2. The air bag 10 comprises a circular front panel 12 and a circular rear panel 14, which are joined together along a periphery 16. The seam joining the front and rear panels is formed by turning their edges inwardly and sewing the reversed edges together, so that the free edges of the panels extend inwardly inside the air bag 10, as is well known in the art.

The front and rear panels 12 and 14 are a woven nylon or polyester fabric of 420 denier, preferably with a neoprene backing layer. The panels are oriented at a 45° bias angle, which balances the tendency of the panels to stretch under the high tension loads experienced in deployment and inflation. This is illustrated in FIGS. 1 and 2 by schematically enlarged weave 13 of front panel 12, showing the orientation of the weave, and the schematically enlarged weave 15 of rear panel 14, showing the weave 15 oriented at a 45° bias to the weave of the front panel. The air bag 10 has a diameter of 27 inches in its unfolded, uninflated condition. Driver's side air bags are generally provided in a diameter range of 24 to 30 inches, and the invention herein is applicable to such diameters.

Centrally located on the back panel 14 is an inlet opening 18 defined by a mounting collar 20. The mounting collar 20 is securely fastened to the fabric of the rear panel and reinforces it for mounting the air bag to an inflator module, as is known in the art and is also shown in other figures, e.g., FIGS. 4 and 12.

The back panel 14 further defines two peripherally reinforced vent openings 22 and 23 which permit the controlled escape of gas from the air bag 10. This occurs to permit controlled deflation and optimum energy absorption by the air bag during occupant interaction in a crash deployment, also as known in the art.

The air bag 10 is characterized by break-away stitching which releasably secures the front and rear panels together to define a central region 32 and two lateral lobes 34 and 36. Stitch lines 24, 26, 28 and 30 are arranged in two parallel lines flanking the inlet opening 18 and mounting collar 20, and interrupted in the vicinity thereof. More particularly, the stitch lines 24, 26 and the stitch lines 28, 30 are deployed 7 inches apart, extend to within 1½ inches of the periphery, and have an interruption 8 inches long in the vicinity of the inlet opening 18. The interruption provides for a direct flow of inflation gasses from the inlet opening to the lateral lobes 34 and 36. The inlet opening 18 itself is 4 inches in diameter.

The thread for the stitches is preferably 92 ounce nylon thread, and the stitches are applied in the range of 6 to 11 per inch, and preferably 9 per inch for the embodiment shown. The stitch lines are terminated by one or more back stitches or lock stitches. Alternatively, the nylon ends of the thread may be melted to form a small mass which maintains the stitches against pulling out prematurely. As a matter of general design principle, the threads, stitch length and stitch termination are all selected such that they do not threaten the structural integrity of the air bag fabric, and such that they will break away in operative deployment of the air bag 10, as further described below.

The stitch lines 24, 26, 28 and 30 divide the air bag 10 into a central region 32 lying generally between the stitch lines and, viewed from the front, a left lateral lobe 34 and a right lateral lobe 36. The interruptions between the stitch lines 24, 26 and 28, 30 provide passageways 38 and 40, respectively, from the inlet 18 into the left lateral lobe 34 and the right lateral lobe 36, respectively, for direct flow of inflation gasses to the lateral lobes.

Figure 12:
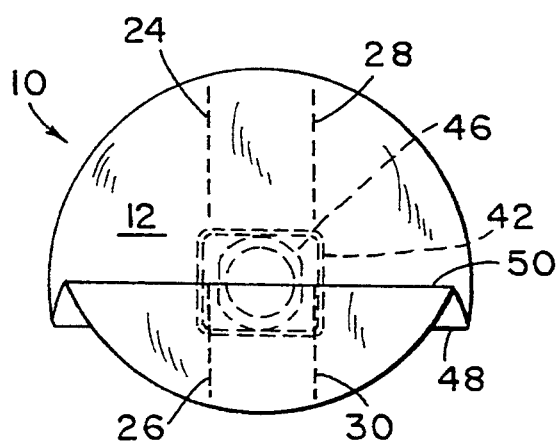
FIG. 12 is a front elevation view of the air bag of FIG. 1 being folded in accordian folds;.
Figure 13:
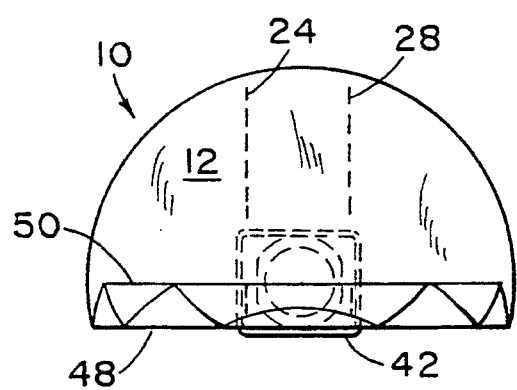
FIG. 13 is a front elevation view of the air bag of FIG. 1 being folded in further accordian folds.
Figure 14:
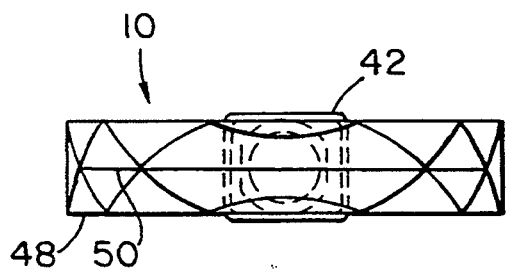
FIG. 14 is a front elevation view of the air bag of FIG. 1 folded in accordian folds.

FIGS. 12–17 illustrate folding the air bag 10 for storage prior to use in a crash. The mounting collar 20 of the air bag 10 is secured to a module housing 42 using an air bag retaining ring 44, as seen in FIGS. 12–17 and 4, 6, etc. The module housing is mounted in a steering wheel hub compartment (not shown) in the usual manner. With reference to FIG. 12, the lower portion of the air bag 10 is folded in accordian folds, at fold lines 48, 50 which are within the lower portion of the module housing 42. FIG. 13 illustrates three more accordian folds applied to the lower portion of the air bag, and FIG. 14 illustrates accordian folds also applied to the upper portion of the air bag 10.

The accordian folds 48, 50, etc. place the material of the air bag within the vertical (as viewed in the front elevation view Figures) extent of the storage space for the air bag in the module housing 42. The accordian folds are transverse to the stitch lines 24, 26 and 28, 30, as well as to the central region 32. Thus, the accordian folds do not block an initial flow of inflation gasses through the passages 38, 40, but do require some unfolding of the air bag 10 before the inflation gasses pass freely to the peripheral extent of the central region.

Figure 15:
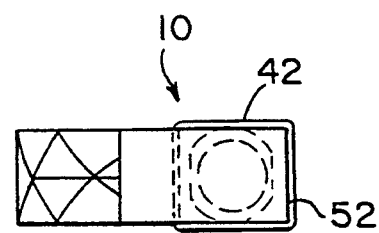
FIG. 15 is a front elevation view of the air bag of FIG. 1, folded in accordian folds and being folded in packing folds.
Figure 16:
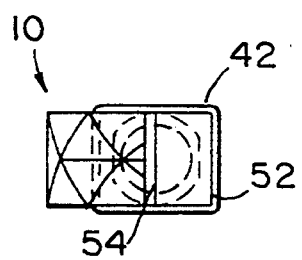
FIG. 16 is a front elevation view of the air bag of FIG. 1, folded in accordian folds and being folded in further packing folds.
Figure 17:
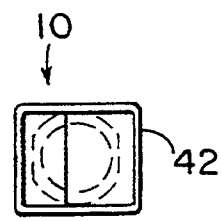
FIG. 17 is a front elevation view of the air bag of FIG. 1 folded in accordian and packing folds for storage prior to deployment.

With reference to FIGS. 15–17, the accordian-folded air bag 10 is further folded in packing folds to fit the air bag 10 in the module housing 42. The packing folds are accomplished by folding the extending accordian-folded air bag material across the hub at fold line 52 (FIG. 15), then folding it back from the center line at fold line 54, and repeating for each side until the air bag is reduced in size to fit within the module housing 42. FIG. 16 shows the right side fully folded into the module housing 42, and the left side partially folded. FIG. 17 shows the air bag fully folded. A breakaway cover is placed over the air bag, as is well-known in the art.

Figure 3:
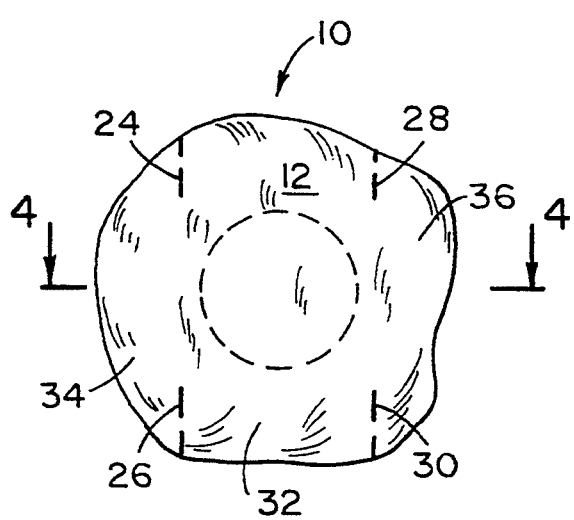
FIG. 3 is an enlarged front elevation view of the air bag of FIG. 1 mounted to a source of inflation gas and shown in its initial stages of deployment and inflation.
Figure 4:
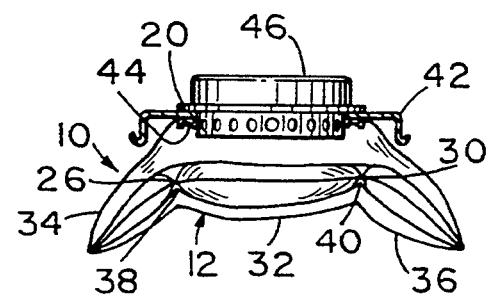
FIG. 4 is an enlarged sectional view of the air bag of FIG. 1, taken along the lines 4—4 of FIG. 3.

FIGS. 3–11 illustrate the deployment and inflation of the air bag 10. The unfolding, initial deployment and inflation of the air bag occur very rapidly and substantially simultaneously, i.e., inflation begins and causes unfolding and there is some inflation near the inlet opening before the air bag is completely unfolded. However, for purposes of illustration, the air bag is shown unfolded in the sequence beginning with FIGS. 3 and 4. With reference to FIG. 4, the air bag 10 is mounted to the module housing 42 within the steering wheel hub (not shown), and the module includes a gas generator 46.

Upon sensing of a crash condition, the gas generator 46 activated and produces gas which is introduced through the inlet opening 18 in the rear panel of the air bag 10. Initial inflation of the air bag 10 causes the cover of steering wheel hub to break away, and the air bag 10 begins to inflate and deploy.

FIGS. 3 and 4 illustrate early deployment of the air bag 10. At this early stage of deployment, the central region 32 front panel 12 has begun forward motion toward the vehicle occupant. However, this motion is restrained by the stitch lines 24, 26, 28 and 30, which at this time maintain the front panel 12 attached to the back panel 14. At the same time, some of the gas entering the inlet opening 18 flows laterally, through passageway 38 between stitch lines 24, 26 to enter the left lateral lobe 34, and through passageway 40 between stitch lines 28 and 30 to enter the right lateral lobe 36. The lateral lobes therefore also begin to inflate, establishing a relatively broad frontal surface of the air bag 10 during very early stages of deployment.

Figure 5:
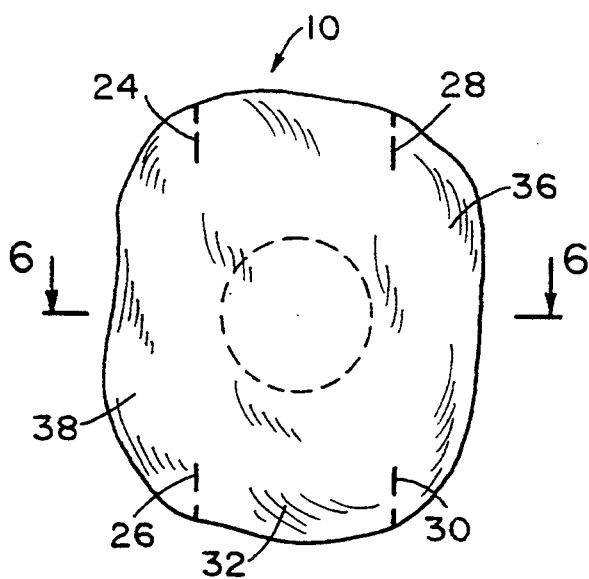
FIG. 5 is an enlarged front elevation view of the air bag of FIG. 1, similar to FIG. 3 but with the air bag in a further stage of deployment and inflation.
Figure 6:
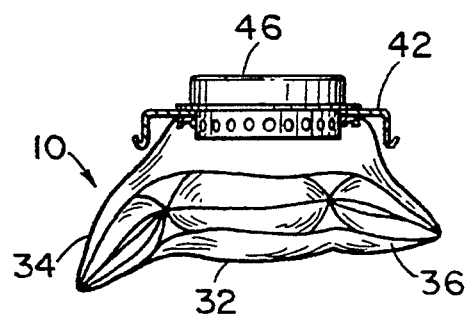
FIG. 6 is an enlarged sectional view of the air bag of FIG. 1, taken along the lines 6—6 of FIG. 5.

With respect to FIGS. 5 and 6, the deployment of the air bag 10 continues as the inflation gas accumulates therein and additional inflation gas is provided from the gas generator 46 In FIGS. 5 and 6, the front panel portion of central region 32 has continued to expand forwardly and the lateral lobes 34 and 36 continue to fill. In FIG. 5 and 6, the breakaway stitch lines have also begun to release, permitting the front panel of the air bag 10 to separate from the rear panel. The stitch lines break away from the central portion of the panels, near the inlet opening 18 of the inflation gas, and thereafter rip toward the periphery.

The releasing of the breakaway stitch lines is believed caused in part by the forward momentum imparted to the mass of material comprising the front panel 12 of the air bag. In the central region 32, this material is also driven by a high pressure column of gas entering the air bag through the inlet opening 18. If unrestrained, the momentum and gas pressure would cause the front panel 12 to deploy outwardly in a very rapid manner, forming an elongated column extending beyond the desired full inflation position of the air bag. Such extension of the front panel could strike the vehicle occupant and potentially cause abrasions. The breakaway stitches of the stitch lines 24, 26, 28 and 30 retard the forward deployment of the central region 32 of the air bag 10, initially by means of the attachment of the front panel to the back panel and thereafter by the time and energy dissipated in breaking away the stitches connecting the front panel and the back panel. This retardation time results in greater filling of the lateral portions of 34 and 36 of the air bag, such that the air bag displays a broader frontal surface as it deploys toward the vehicle occupant, and does not exhibit the undesirable over-extension.

Figure 7:
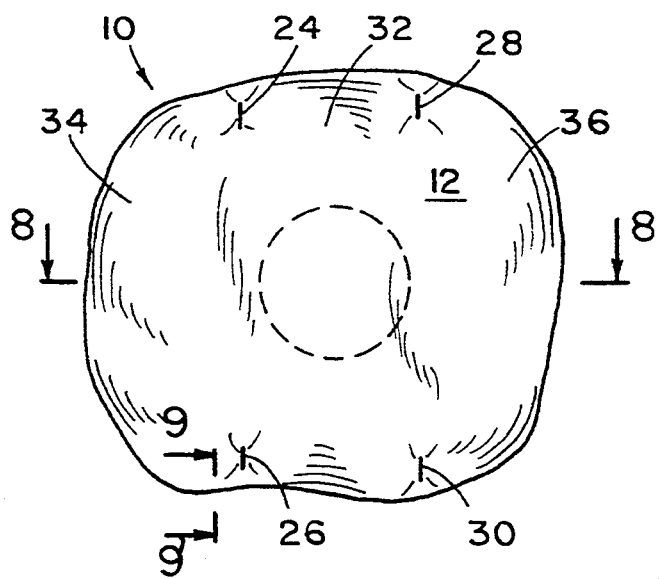
FIG. 7 is an enlarged front elevation view of the air bag of FIG. 1, similar to FIGS. 3 and 5 but with the air bag in a further stage of deployment and inflation.
Figure 8:
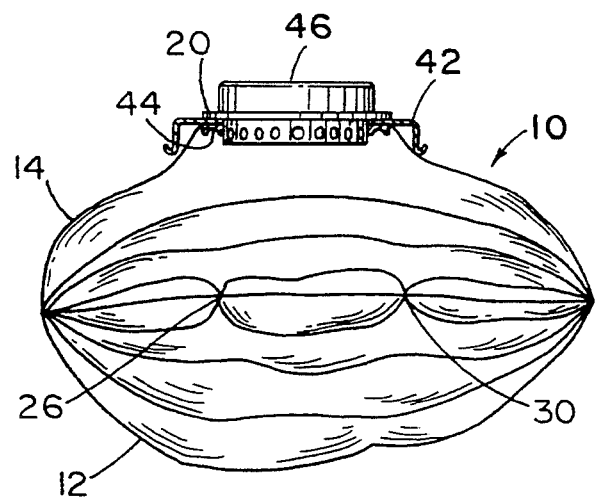
FIG. 8 is an enlarged sectional view of the air bag of FIG. 1, taken along the lines 8—8 of FIG. 7.
Figure 9:
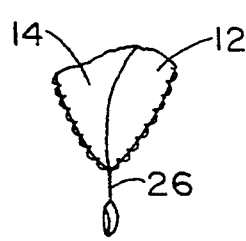
FIG. 9 is an enlarged fragmentary sectional view of the air bag of FIG. 1, taken along the lines 9—9 of FIG. 7.
Figure 10:
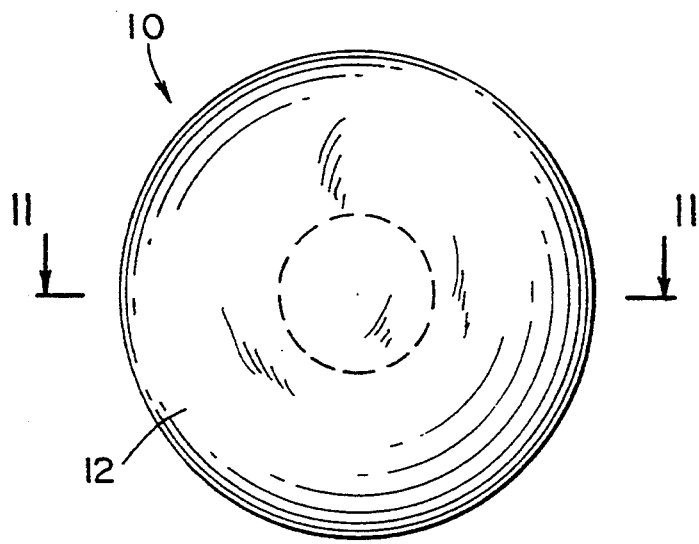
FIG. 10 is an enlarged front elevation view of the air bag of FIG. 1, similar to FIGS. 3, 5 and 7 with the air bag fully deployed and inflated.
Figure 11:
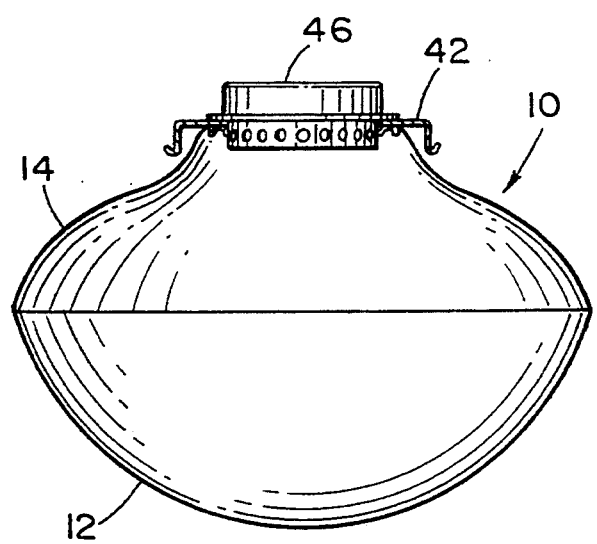
FIG. 11 is an enlarged sectional view of the air bag of FIG. 1, taken along the lines 11—11 of FIG. 10.

With reference to FIGS. 7 and 8, the air bag is further deployed. At this point the stitches have almost completely broken away, as illustrated in the fragmental view of FIG. 9. However, the effect of retarding the forward motion of the central region 32 to permit filling of the lateral regions 34 and 36 is illustrated in the broad, substantially smooth and even forward moving front panel 12. With respect to FIGS. 10 and 11, the air bag 10 is shown fully inflated, the stitches having fully broken away.

Figure 18:
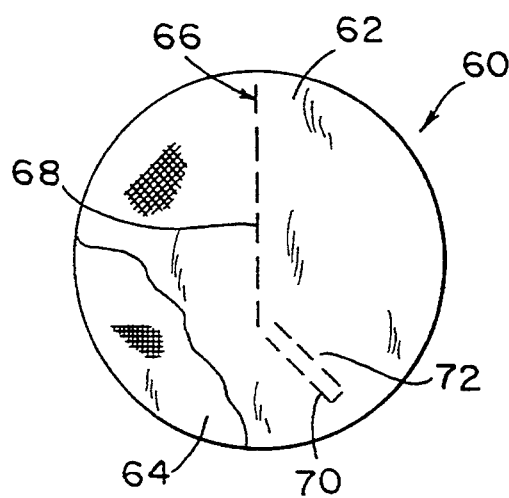
FIG. 18 is an enlarged fragmentary view of another air bag according to the invention herein, showing a termination of a stitch line.
Figure 19:
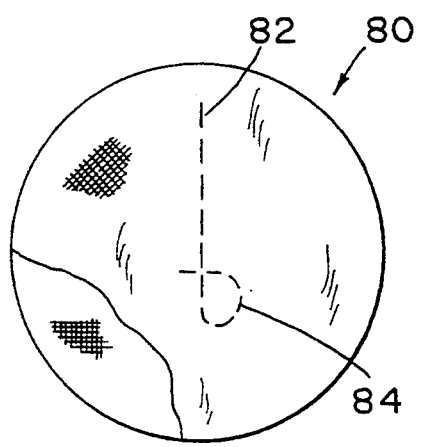
FIG. 19 is an enlarged fragmentary plan view of another bag according to the invention herein, showing a termination a stitch line.

FIG. 18 shows a small section of another air bag 60 according to the invention herein, comprising a front panel 62, a rear panel 64 on a bias thereto, and breakaway stitches 66. The breakaway stitches are deployed in a line portion 68, with an angled end segment 70 and a reversed parallel angled end segment 72. This end configuration is useful in requiring a substantial separating force between the front and rear panels to begin the breakaway process. FIG. 19 illustrates another end configuration utilized in an air bag 80. A line 82 of breakaway stitches terminates in a loop 84 crossing over the line 82. This configuration also requires a substantial separating force to begin the breakaway process. The air bags 60 and 80 are otherwise similar to the air bag 10 described above.

By utilizing the breakaway stitching, the deployment of the air bag is controlled so that it does not, during the deployment process, extend beyond (or at least substantially beyond) the final position of the air bag when it is fully deployed and inflated. Thus, the vehicle occupant is protected against the injury over extension of the front panel can cause. Additionally, the early inflation of the lateral lobes of the air bag 10 provides a greater area of restraint to the vehicle occupant, in the event the vehicle occupant contacts the air bag prior to full inflation thereof.

Accordingly, preferred embodiments of vehicle air bags have been described which admirably achieve the objects of the invention herein. With reference to the description of the preferred embodiment, those skilled in the art will appreciate that modifications may be made without departing from the spirit of the invention. As examples of such modifications, the breakaway stitching may be deployed in modified patterns which restrain initial forward deployment of the central portion of the air bag and provide flow to the lateral lobes, and the breakaway stitching itself may be provided in discontinuous, localized portions together forming the desired pattern. Therefore, it is not intended that the scope of the invention be limited to the specific embodiment illustrated and described. Rather, it is intended that the scope of the invention be determined by the appended claims and equivalents thereof.

We claim:

1. A vehicle air bag for inflation in the event of a crash to cushion a vehicle occupant, the air bag comprising:
   A) a rear panel defining an inlet opening adapted for attachment to a source of inflation gas;
   B) a front panel, the front and rear panels being joined together along their peripheral edges;
   C) the front and rear panels further joined together by releasable stitching deployed to provide the air bag with two substantially equally sized lateral lobes symmetrically disposed with respect to the inlet opening, each lateral lobe being defined by substantially more than one-fourth of each of the front and rear panels, said stitching further deployed to provide a passageway for direct flow of inflation gas to each of the lateral lobes upon initial gas generation and consequent deployment of the air bag, and said releasable stitching adapted to release prior to full inflation of the air bag.

2. A vehicle air bag as defined in claim 1 wherein the releasable stitching is deployed to further provide an elongated central region between the two lateral lobes, the central region extending between diametrically opposed portions of the joined peripheral edges of the front and rear panels and including the inlet opening.

3. A vehicle air bag as defined in claim 2 wherein the releasable stitching is deployed along stitch lines extending from adjacent the inlet opening toward the joined peripheral edges of the front and rear panels.

4. A vehicle air bag as defined in claim 3 wherein the releasable stitching is deployed along two generally parallel stitch lines flanking the inlet opening, the stitch lines being discontinuous adjacent the inlet opening to provide the passageways for direct flow of inflation gas to the lateral lobes upon initial gas generation and consequent deployment of the air bag.

5. A vehicle air bag as defined in claim 4 wherein the releasable stitch lines are continuous except for the passageways adjacent the inlet opening.

6. A vehicle air bag as defined in claim 5 wherein the front and rear panels of the air bag are fabric having a denier range of 400–450, the releasable stitching utilizes nylon thread in the range of 80–100 ounces, and the stitches are applied in the range of 6 to 11 per inch.

7. A vehicle air bag as defined in claim 6 wherein the panels of the air bag are fabricated of 420 denier fabric and the releasable stitching utilizes 92 ounce nylon thread deployed at 9 stitches per inch.

8. A vehicle air bag as defined in claim 5 wherein the stitch lines are terminated adjacent the inlet opening with an angled end portion.

9. A vehicle air bag as defined in claim 5 wherein the stitch lines are terminated adjacent the inlet opening in a loop.

10. A vehicle air bag as defined in claim 5 wherein the releasable stitch lines are provided on a bias to the fabric of the front panel.

11. A vehicle air bag as defined in claim 4 wherein the front and rear panels are circular.

12. A vehicle air bag as defined in claim 11 wherein the inlet opening is centrally located in the rear panel.

13. A vehicle air bag as defined in claim 12 wherein the front and rear panels have a diameter in the range of 24 to 30 inches and the parallel stitch lines of releasable stitching are in the range of 6 to 8 inches apart.

14. A vehicle air bag as defined in claim 13 wherein the front and rear panels have a diameter of approximately 27 inches and the parallel lines of stitching are 7 inches apart.

15. A vehicle air bag as defined in claim 13 wherein the passageways for direct flow of inflation gas to the lateral lobes have a width at least as large as the diameter of the inlet opening.

16. A vehicle air bag as defined in claim 15 wherein the passageways comprise an approximately 8 inch interruption in each of the stitch lines.

17. A vehicle air bag as defined in claim 11 folded for storage prior to inflation and deployment, said folds including
   1) accordian folds perpendicular to the stitch lines defining the central region and lateral lobes, and
   2) packing folds substantially perpendicular to the accordian folds,
   3) the accordian folds being applied first and the packing folds being applied second, and the accordian and packing folds together reducing the size of the air bag to that required for storage prior to inflation and deployment.

18. A vehicle air bag as defined in claim 2 wherein the lateral lobes are larger than the central region.

19. A vehicle air bag as defined in claim 18 wherein the releasable stitching is deployed along stitch lines extending from adjacent the inlet opening toward the joined peripheral edges of the front and rear panels.

20. A vehicle air bag as defined in claim 19 wherein the releasable stitching is deployed along two generally parallel stitch lines flanking the inlet opening, the stitch lines being discontinuous adjacent the inlet opening to provide the passageways for direct flow of inflation gas to the lateral lobes upon initial gas generation and consequent deployment of the air bag.

21. A vehicle air bag as defined in claim 1 wherein the releasable stitching is selected and deployed to retard outward deployment of the front panel during inflation of the air bag substantially beyond the position attained by the front panel upon full inflation of the air bag.

22. A vehicle air bag for inflation in the event of a crash to cushion a vehicle occupant, the air bag comprising:
   A) a circular rear panel defining a substantially central inlet opening adapted for attachment to a source of inflation gas;
   B) a circular front panel, the front and rear panels joined together along their peripheral edges;
   C) the front and rear panels further joined together by releasable stitching deployed in two generally parallel lines substantially flanking the inlet opening, the lines of stitching dividing the air bag into a central region and two lateral lobes;
   D) said lines of releasable stitching being discontinuous adjacent the inlet opening to provide a passageway for direct flow of inflation gas to each lateral lobe upon initial gas generation and consequent deployment of the air bag; and E) said releasable stitching utilizing thread and stitch size selected such that the stitching releases prior to full inflation of the air bag.

23. A vehicle air bag as defined in claim 22 wherein the releasable stitching is selected and deployed to retard outward deployment of the front panel during inflation of the air bag substantially beyond the position attained by the front panel upon full inflation of the air bag.

24. A vehicle air bag as defined in claim 21 folded for storage prior to inflation and deployment, said folds including 1) accordian folds perpendicular to the lines of stitching defining the central region and lateral lobes, and
2) packing folds substantially perpendicular to the accordian folds,
3) the accordian folds being applied first and the packing folds being applied second, and the accordian and packing folds together reducing the size of the air bag to that required for storage prior to inflation and deployment.

25. A vehicle air bag as defined in claim 24 wherein the releasable stitching is selected and deployed to retard outward deployment of the front panel during inflation of the air bag substantially beyond the position attained by the front panel upon full inflation of the air bag.

* * * * *